Patented June 8, 1937

2,083,214

UNITED STATES PATENT OFFICE 2,083,214

PREPARING 4, 4'-DIALKOXY DIPHENYL-AMINES

William Baird, Cecil Robert Mavin, and Arthur George Murray, Blackley, Manchester, England, assignors to Imperial Chemical Industries Limited, a corporation of Great Britain No Drawing. Application January 9, 1936, Serial No. 58,414. In Great Britain January 11, 1935

7 Claims. (Cl. 260—128)

This invention relates to processes for preparing 4,4'-dialkoxy diphenylamines and more particularly the manufacture of 4,4'-dimethoxy diphenylamine.

In Ber. der deutchen chem. Ges. 1908, 41, 3493 there is described the production of 4,4'-dimethoxy diphenylamine by interacting iodoanisole with acetyl-p-anisidine. The complicated method of Meyer and his co-workers (Ber. der deutschen chem. Ges. 1919, 52, 1478; 1921, 54, 332) from anisole via the quinoid salts of di-p-anisylhydroxylamine N-oxide gives very low yields of 4,4'-dimethoxy diphenylamine and cannot be considered as a method of preparation.

An object of the present invention is to provide a new and improved process for making 4,4'-dialkoxy diphenylamines and particularly 4,4'-dimethoxy diphenylamine. Other objects are to provide new compositions of matter and to advance the art. Still other objects will appear hereinafter.

These objects may be accomplished in accordance with our invention which comprises alkylating 4,4'-dihydroxy diphenylamine with the alkyl esters of inorganic acids. This process is preferably carried out in an inert liquid medium and in the presence of caustic alkali. We have found that this method is particularly adapted for the preparation of 4,4'-dimethoxy diphenylamine from 4,4'-dihydroxy diphenylamine and a methyl ester of an inorganic acid such as methyl chloride, dimethyl sulfate and the like. Working according to our process we obtain higher yields than are obtainable from iodoanisole and avoid the use of the expensive iodoanisole. We also obtain very much higher yields than are produced in the process involving the use of quinoid salts. The product obtained is usually a mixture of the 4,4'-dialkoxy diphenylamine and its N-alkyl derivative, the N-alkyl derivative generally being present in an amount of about 20 to 25%.

While our process is particularly adapted for making 4,4'-dimethoxy diphenylamine it may also be employed for making 4,4'-dialkoxy diphenylamines in general and particularly the diethoxy, dipropoxy, dibutoxy and the like compounds. These alkoxy compounds are prepared from the corresponding alkyl esters of the inorganic acids.

In general, it will be found that the chlorides and sulphates are the most effective esters. However, other esters such as the iodides, bromides, phosphates and the like may be substituted but with less satisfactory results.

The process is preferably carried out in the presence of a caustic alkali such as caustic soda, caustic potash and other alkali metal or alkaline earth hydroxides. The term "caustic alkali" will be understood to include the hydroxides of the alkaline earth metals as well as those of the alkali metals.

The 4,4'-dimethoxy diphenylamine is a valuable antioxidant for rubber. The N-methyl 4,4'-dimethoxy diphenylamine is also a valuable antioxidant for rubber are the other 4,4'-dialkoxy diphenylamines.

In order to more fully illustrate our invention and the preferred modes of carrying the same into effect, the following examples are given in which the parts are by weight.

Example 1

100 parts of 4,4'-dihydroxydiphenylamine (made as described in Mon. Scient. 1902, (4), 16, II, 870) are dissolved in 200 parts of ethyl alcohol contained in an autoclave, 50 parts of solid caustic soda are added. The autoclave is closed and heated to 95° C. while the contents are stirred continuously. Methyl chloride is then passed into the autoclave to give a pressure of 50 lbs. per sq. in. and this pressure is maintained until 76 parts of methyl chloride have been added. The temperature is kept at 90–95° C. during the addition and the heating is continued at 95° C., until the pressure drops to about 20 lbs. which shows the methylation is nearly complete, and then for 2 hours longer.

Alcohol is distilled off and the product washed by stirring with boiling water, more caustic soda being added unless the mixture is alkaline to Clayton Yellow paper. The product is allowed to cool, filtered off, washed with water and dried. In this way 115 parts of a mixture of crude 4,4'-dimethoxy diphenylamine and N-methyl-4,4'-dimethoxy diphenylamine are obtained. This mixture may be purified either by distillation in vacuo or by crystallization from alcohol giving colourless glistening leaves M. P. 94–96° C. If it is desired to prevent the product darkening during isolation, 1 part of sodium hydrosulphite may be added during washing.

If, instead of adding the whole of the caustic soda at the beginning, it is added in portions during the course of the methylation, a slightly higher yield is obtained.

Example 2

50 parts of 4,4'-dihydroxydiphenylamine are dissolved in 400 parts of water and 11 parts of solid caustic soda in an atmosphere of nitrogen and in the presence of 0.5 part of sodium hydrosulphite. The solution is heated to 95° C., stirred vigorously and 95 parts of dimethyl sulphate and 180 parts of 40% caustic soda solution added simultaneously during 2 hours, a slow stream of nitrogen being passed through the apparatus. After a further 2 hours at 95° C. the mixture is cooled, filtered, and the residue washed with water and dried. 53.5 parts of a mixture of 4,4'-dimethoxydiphenylamine and N-methyl-4,4'-dimethoxydiphenylamine, which may be purified as in Example 1, are thus obtained.

While we have disclosed the use of alcohol and water as suitable solvents it will be readily apparent to those skilled in the art that many other solvents may be substituted therefor the choice of which will depend largely on the reagents being employed. It will also be readily apparent that many other variations and modifications may be made in our process without departing from the spirit of our invention. Accordingly, the scope of our invention is to be limited solely by the appended claims construed as broadly as is permissible in view of the prior art.

We claim:

1. The process which comprises reacting a lower alkyl ester of an inorganic acid with 4,4'-dihydroxy diphenylamine at temperatures of about 90° to about 95° C. in the presence of caustic alkali.

2. The process which comprises reacting a lower alkyl ester of an inorganic acid with 4,4'-dihydroxy diphenylamine in the presence of caustic alkali.

3. The process which comprises reacting a lower alkyl ester of an inorganic acid with 4,4'-dihydroxy diphenylamine in the presence of caustic alkali, the proportions being such that there is at least one available alkyl radical for each phenolic hydroxyl.

4. The process which comprises reacting a methyl ester of an inorganic acid with 4,4'-dihydroxy diphenylamine in the presence of caustic alkali.

5. The process which comprises reacting a methyl ester of an inorganic acid with 4,4'-dihydroxy diphenylamine at temperatures of about 90° to about 95° C. and in the presence of caustic alkali.

6. The process which comprises reacting at least two mols of methyl chloride with one mol. of 4,4'-dihydroxy diphenylamine in the presence of caustic alkali.

7. The process which comprises reacting at least one mol. of dimethyl sulphate with one mol. of 4,4'-dihydroxy diphenylamine in the presence of caustic alkali.

WILLIAM BAIRD.
CECIL ROBERT MAVIN.
ARTHUR GEORGE MURRAY.

CERTIFICATE OF CORRECTION.

Patent No. 2,083,214.  June 8, 1937.

WILLIAM BAIRD, ET AL.

It is hereby certified that error appears in the printed specification of the above numbered patent requiring correction as follows: Page 1, second column, line 11, after the word "rubber" insert as; and that the said Letters Patent should be read with this correction therein that the same may conform to the record of the case in the Patent Office.

Signed and sealed this 19th day of October, A. D. 1937.

Henry Van Arsdale.
Acting Commissioner of Patents.

(Seal)